United States Patent [19]

McCowin

[11] Patent Number: 5,299,894
[45] Date of Patent: Apr. 5, 1994

[54] WORKPIECE POSITIONING AND DRILLING END EFFECTOR

[75] Inventor: Peter D. McCowin, Enumclaw, Wash.

[73] Assignee: The Boeing Company, Seattle, Wash.

[21] Appl. No.: 996,806

[22] Filed: Dec. 23, 1992

[51] Int. Cl.$^5$ ............................................. B23B 35/00
[52] U.S. Cl. .................................. 408/1 R; 408/61;
408/67; 408/72 R; 408/97; 901/41
[58] Field of Search ............ 408/67, 72 R, 95, 97–100,
408/102, 1 R, 129, 56, 61, 72 B; 901/41

[56] References Cited

U.S. PATENT DOCUMENTS

| | | | |
|---|---|---|---|
| 1,296,470 | 3/1919 | Bovard . | |
| 2,592,432 | 4/1952 | Kline et al. . | |
| 3,154,338 | 10/1964 | Leach | 294/88 |
| 4,598,453 | 7/1986 | Wills | 29/271 |
| 4,613,262 | 9/1986 | Woods | 409/211 |
| 4,858,334 | 8/1989 | Heitzmann | 33/673 |
| 5,127,139 | 7/1992 | McCowin et al. | 29/26 A |
| 5,203,855 | 4/1993 | Givler et al. | 408/1 R |

FOREIGN PATENT DOCUMENTS

| | | |
|---|---|---|
| 1363431 | 5/1963 | France . |
| 60-249519 | 10/1985 | Japan . |
| 103485 | 10/1922 | Switzerland . |
| 1196261 | 7/1985 | U.S.S.R. . |
| 1252164 | 8/1986 | U.S.S.R. . |
| 12279 | 5/1910 | United Kingdom . |

*Primary Examiner*—Steven C. Bishop
*Attorney, Agent, or Firm*—J. Michael Neary; B. A. Donahue

[57] ABSTRACT

An end effector adapted for attachment to and accurate positioning by a robot is provided for positioning a channel-shaped workpiece at a desired position and drilling an accurately located positioning hole in the workpiece. The end effector includes a conventional speeder unit with a Morris taper that can be grasped by the robot and rotated for transfer of torque to the speeder unit. A top plate is attached to the speeder unit and has a central opening to receive a drill collet extending downward from said speeder unit for drilling the holes in the workpiece. A base plate is connected to the top plate by guide rods which are pressed into bores in the base plate and extend through linear bearings in the top plate for self-parallel movement relative to the top plate. A pair of nuts mounted on the top plate is threadedly engaged with a pair of lead screws connected to the base plate so that vertical movement of the base plate will push the lead screws through the nuts and rotate the lead screws. A pinnion is coupled to each of the lead screws and engaged with a sector gear mounted on a pair of paddle shafts supported in bearings in the base plate. A cam roller assembly is connected to the lower end of each paddle shaft and is rotated by the pinnion and sector gears when the robot presses the end effector into the channel of the workpiece so the top plate moves downward toward the base plate, causing the lead screws to move vertically in and rotate in the nuts. The rotating cam roller assemblies engage the sides of the channel in the workpiece and move it to the desired position centered under the axis of the end effector, whereupon the drill drills the hole at the precisely predetermined position.

20 Claims, 12 Drawing Sheets

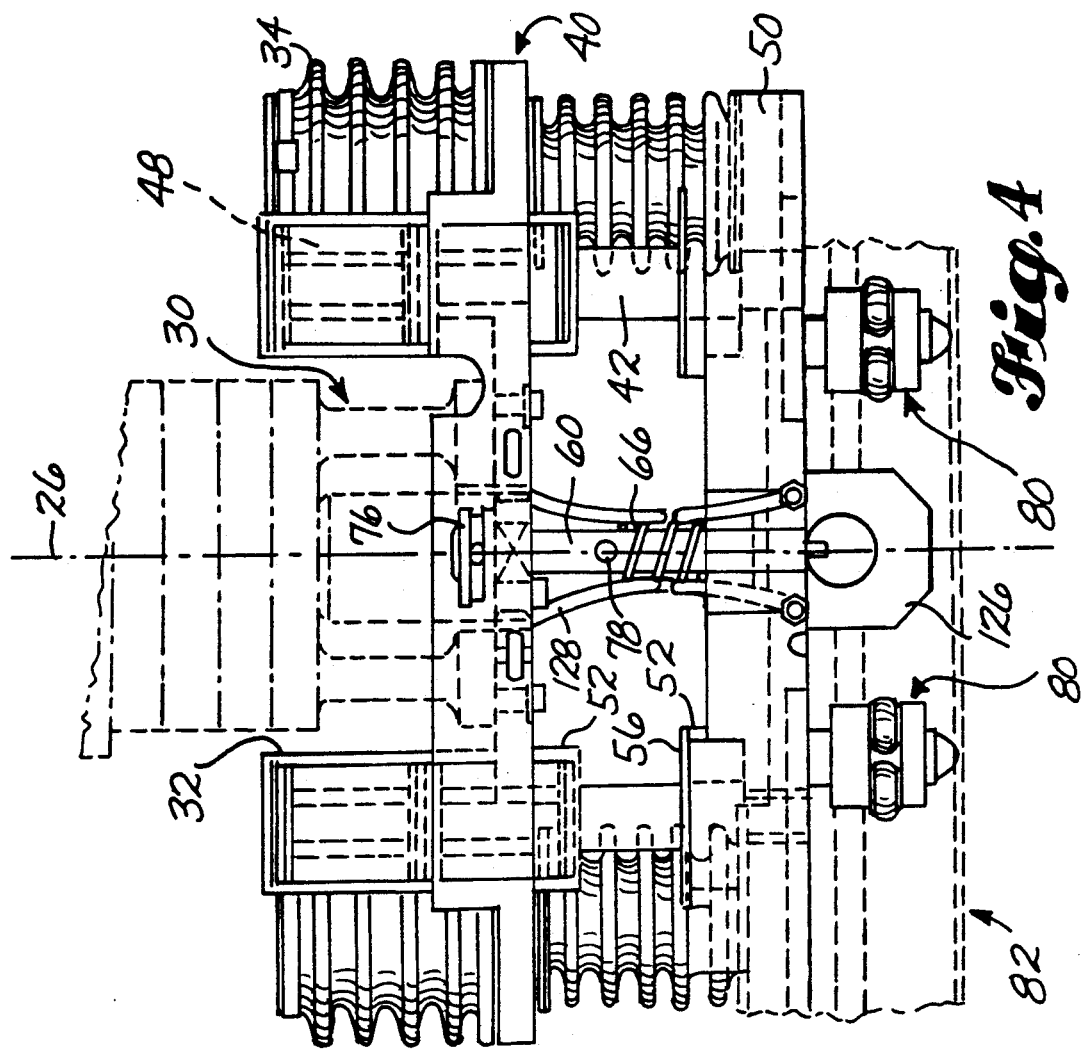
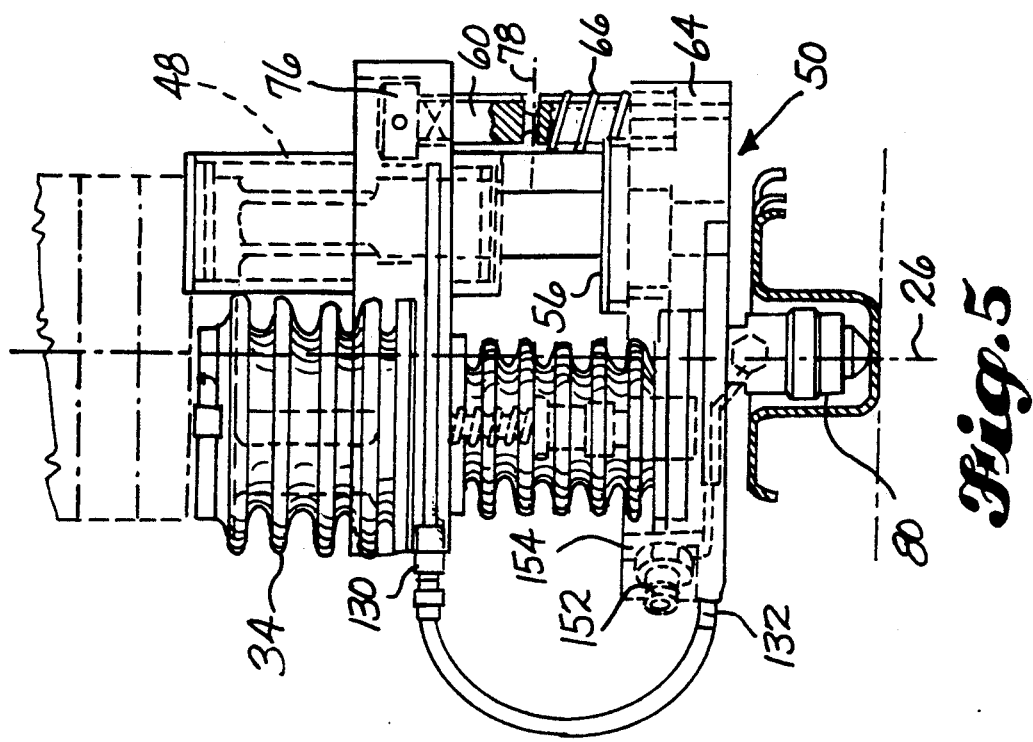

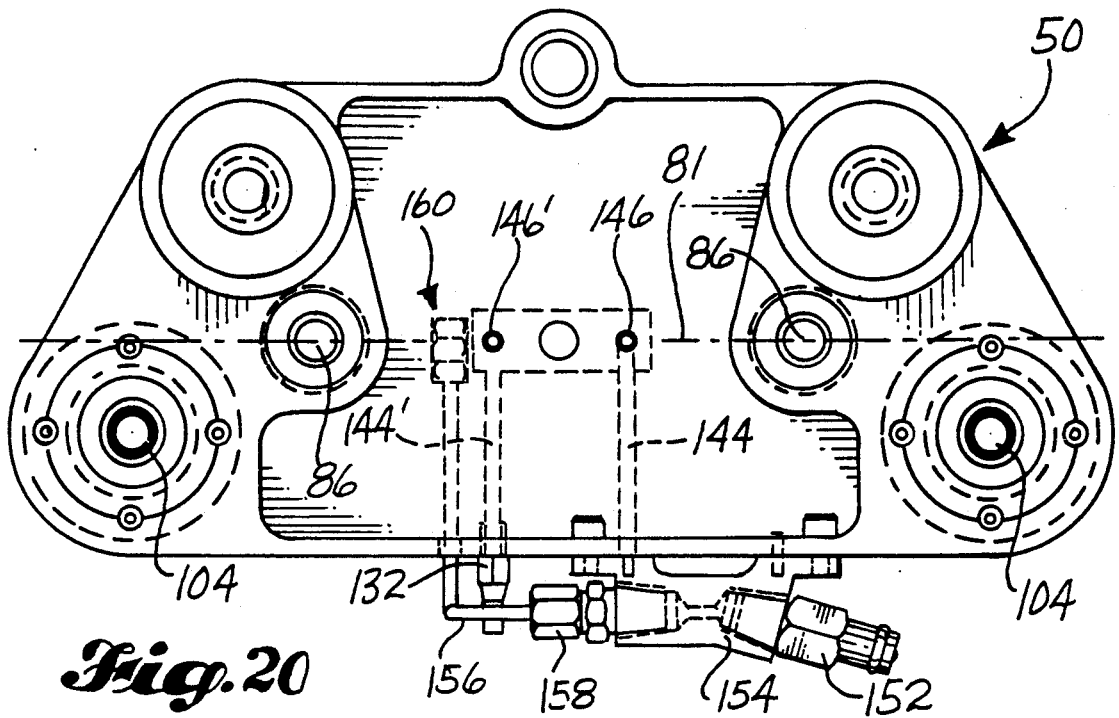
Fig. 20
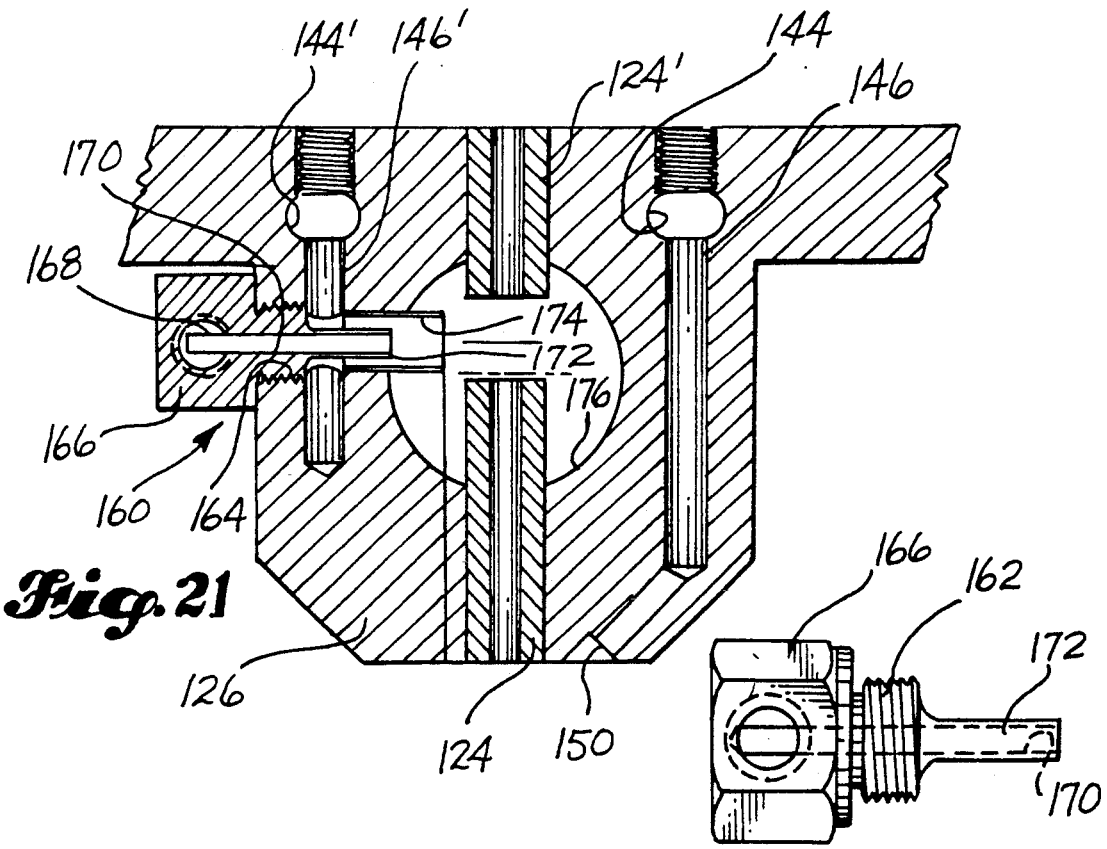
Fig. 21
Fig. 22

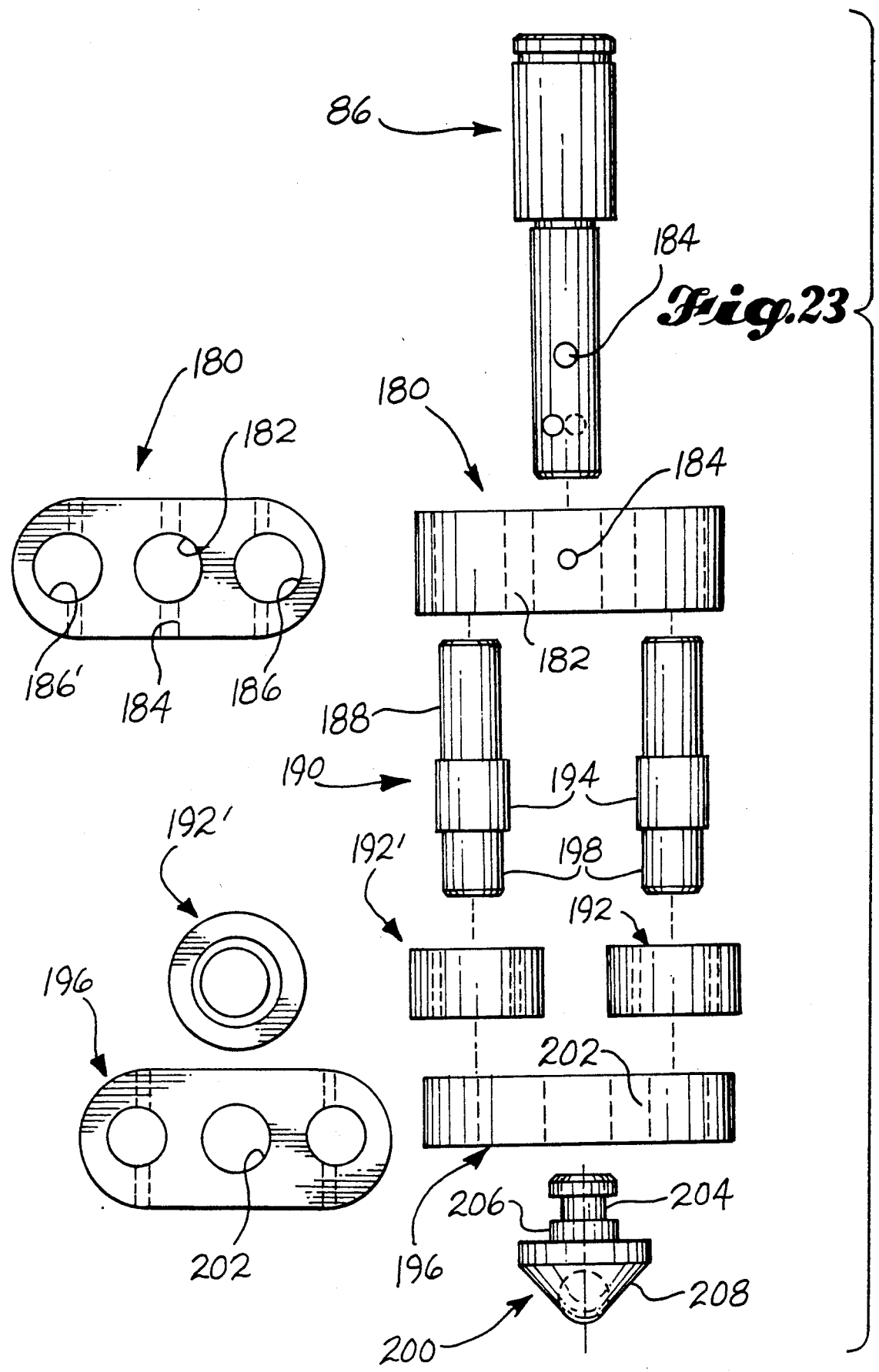

WORKPIECE POSITIONING AND DRILLING END EFFECTOR

This invention relates to end effectors manipulated by robots, for positioning and drilling a workpiece, and more particularly to an end effector for engaging and centering a channel-shaped workpiece under the drill of the end effector for precisely accurate positioning of the workpiece and drilling an accurate positioning hole in the workpiece.

A need has developed in industry for an end effector that can be picked up and manipulated by a robot and used to position a workpiece and then drill a hole in the workpiece that can be used for subsequent assembly of the workpiece with other parts of the product. An end effector with this capability would be useful in many traditional manufacturing applications, but finds especially significant value in a new manufacturing technique known as "virtual tooling assembly," which is disclosed and claimed in a concurrently filed patent application Ser. No. 07/964,533 entitled "PANEL AND FUSALAGE ASSEMBLY."

In traditional manufacturing, parts are normally held in tooling fixtures and assembly jigs to accurately locate the parts by butting their edges against hard stops on the tooling. From those stops, locations on the part are determined for holes, fasteners, and other manufacturing processes which are performed on the part. Assuming that the part is located properly on the tooling and that the drill guides and other parts of the tooling for performing the manufacturing processes have been accurately located, the part will be accurately manufactured. However, in the real-life environment of a factory, the tooling receives some heavy and sometimes abusive use and the accuracy of the stops, drill guides, and other elements of the tooling frequently become worn or otherwise out of adjustment. When this happens, the manufacturing processes on the part can be performed at an incorrect location on the part resulting in slight misalignment of the elements of the finely manufactured product, or if the misalignment is severe, a completely rejected part. The result is increased cost of manufacturing and a degradation of quality.

A new manufacturing technique has been invented called "soft tooling" or "virtual tooling" which eliminates the need for hard tooling used for the positioning of holes, fasteners, and other manufacturing processes The soft tooling technique uses information from the original engineering drawings of the part, such as a panel, to locate the holes and other items on the panel without reference to hard tooling reference stops. One technique is to mount the panel on a fixture which holds it in a fixed position and contour but without reliance on the position of any hard stops on the fixture. The panel is then routed around its entire edge to give it the precise exterior dimensions required by the original engineering data. The holes, fasteners, and parts which are to be placed at particular positions on the panel, are located by positioning or coordination holes drilled in the panel by an end effector held in a highly accurate robot. The positioning of the robot is accomplished by software using positioning information derived from the engineering data for that part, so the part as manufactured is always in conformance with the most current engineering drawing of that part. Any other components which must be attached to the panel are drilled at the same time or on another fixture so that the positioning holes in the panel and on the other components are precisely accurate, well within the required tolerance. After drilling the positioning holes, the panel and other components are removed from the fixture, and the components may be drilled and assembled to the part using the positioning holes. In this way, the components are always located accurately, and the care and recalibration of hard tooling becomes an obsolete requirement.

In order to eliminate the need for hard tooling positioning stops for accurately locating the components relative to the part in which the coordination positioning holes are being drilled, it would be useful for the end effector carried by the robot to be capable of positioning those components exactly in the desired position to ensure that the hole in the component and the hole in the part are drilled in the right position. One such end effector is disclosed in U.S Pat. 5,127,139 entitled "STRINGER CLIP END EFFECTOR" by McCowin, et al. Another end effector required for aircraft manufacturing is one which will align a channel-shaped workpiece such as a stringer at a desired position with respect to the drill axis and hold the stringer in that position while it drills a hole in the channel at the desired lateral position and at the desired position along its length. This end effector is disclosed herein.

The robot used in the particular embodiment of the "virtual tooling" invention noted above is a JOMACH 16 which is most accurate when using a tapered shank coupling for the end effectors. This coupling does not include provision for auxiliary power for the end effectors, so all of the functions must be powered by the rotational power delivered by the robot's spindle, or the force that the robot can exert in the "Z" direction. Since one of the functions required by the drilling and centering end effector is to position the center of the stringer channel under the drill so that the hole is drilled in the exact center of the stringer channel, or at the desired position in the channel specified by the engineering data, the lateral movement of the stringer must be accomplished using rotational power or "Z" axis pushing force.

SUMMARY OF THE INVENTION

Accordingly, it is an object of this invention to provide an improved end effector capable of centering or otherwise locating a U-shaped member such as a stringer at a desired position under the centerline of a drill and drilling a hole on that centerline.

Another object of this invention is to provide an improved centering and drilling end effector that performs a centering motion on the part without need of auxiliary power from the robot on which the end effector is mounted.

Still another object of this invention is to provide an improved centering and drilling end effector that provides a speed-up of the robot spindle speed and delivers a flow of coolant and lubricant to the drill for faster and more precise drilling.

DESCRIPTION OF THE DRAWINGS

The invention and its many attendant objects and advantages will become better understood upon reading the description of the preferred embodiment in conjunction with the drawings, wherein:

FIG. 4 is a rear elevation of the portion of the end effector shown in FIG. 2 below the speeder assembly;

FIG. 5 is a side elevation of the structure shown in FIG. 4;

FIG. 20 is a top plan view of the base plate of the end effector shown in FIGS. 1-5;

FIG. 21 is an enlarged sectional view of the extension nose or tenon of the end effector shown in FIGS. 1-5;

FIG. 22 is an enlarged elevation of the lubrication injector shown in FIG. 21; and FIG. 23 is an exploded view of a cam roller assembly shown on the end effector shown in FIGS. 1-5.

DESCRIPTION OF THE PREFERRED EMBODIMENT

Figure 1:
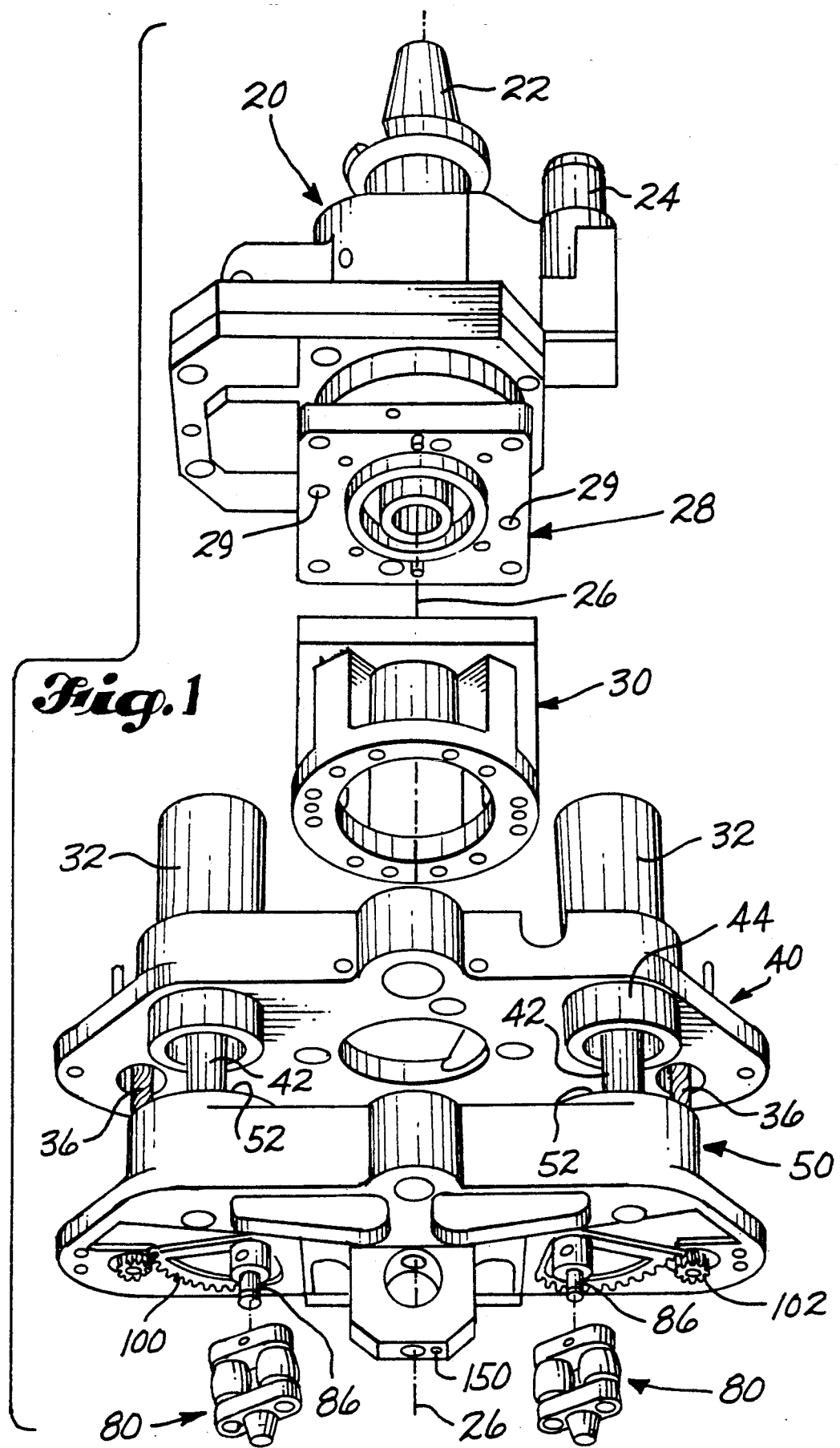
FIG. 1 is an exploded perspective view from the rear side of an end effector according to this invention.
Figure 2:
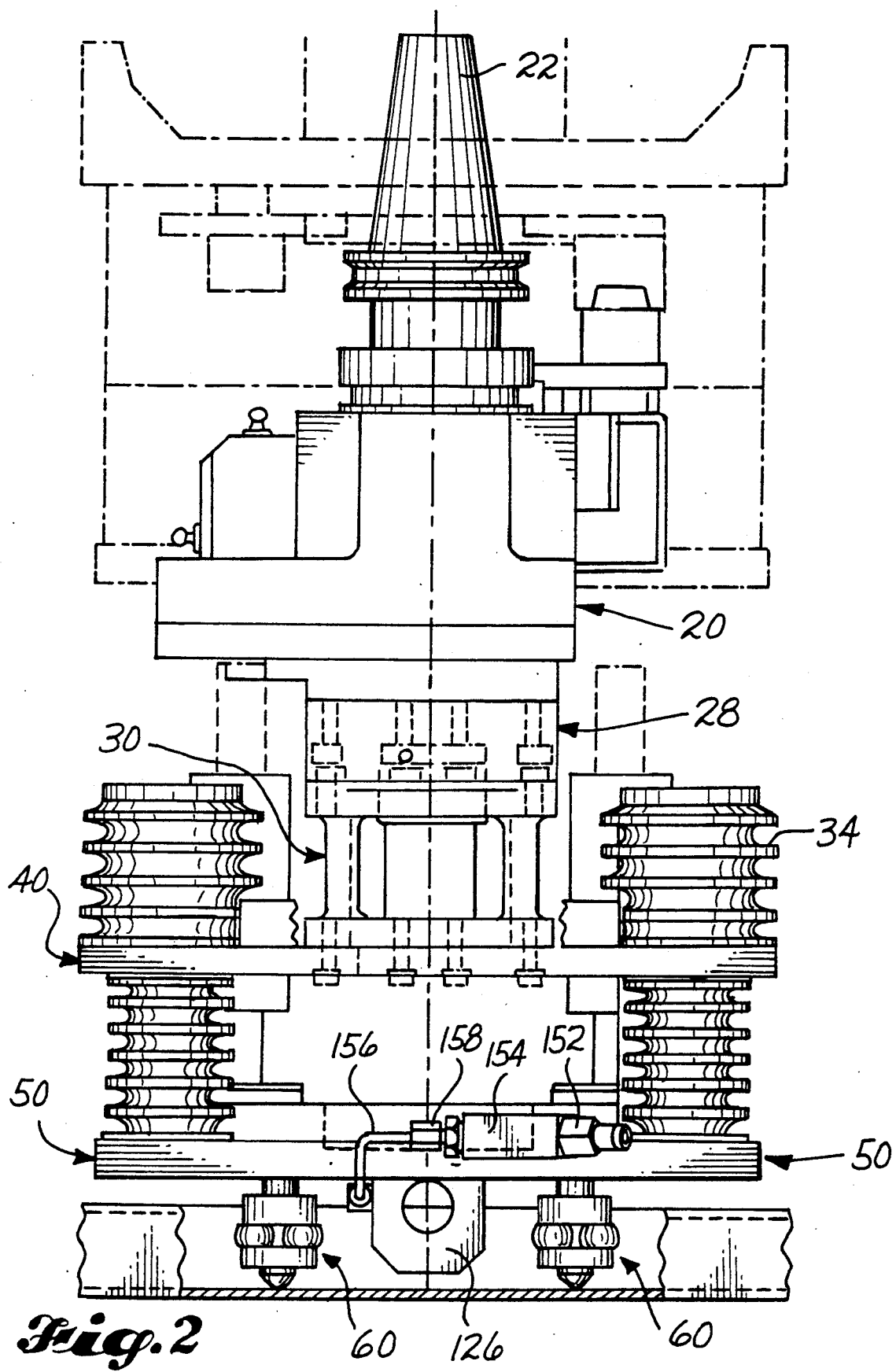
FIG. 2 is an elevation from the front side of the end effector, in assembled form, shown in FIG. 1.

Referring now to the drawings, wherein like reference characters designate identical or corresponding parts, and more particularly to FIGS. 1 and 2 thereof, a drilling and centering end effector is shown in an upright orientation with a speeder assembly 20 having a conical connector 22 for connection to a driven receptacle on a robot such as a JOMACK 16. The description of the end effector will be with respect to this orientation, and words such as "vertically, under, over, etc" will refer to this orientation of the end effector. However, this position reference is merely for convenience of description since the end effector can be used in any orientation that the robot can assume, so those words should be understood to apply to the end effector in its upright position shown in FIGS. 1-5.

The speeder assembly 20 has a set of gears (not shown) which increase the input spindle speed of about 2800 rpm to an output speed at the output spindle of about 14,000 rpm. A positioning pin 24 is provided to one side of the centerline 26 of the end effector to provide reaction torque, to position the end effector on the proper orientation, and to provide an inlet for cooling air flow to the gears of the speeder assembly. The speeder assembly is a commercially available piece of equipment made by Mizoguchi Ironworks & Company, Ltd., in Nara, Japan.

Figure 3:
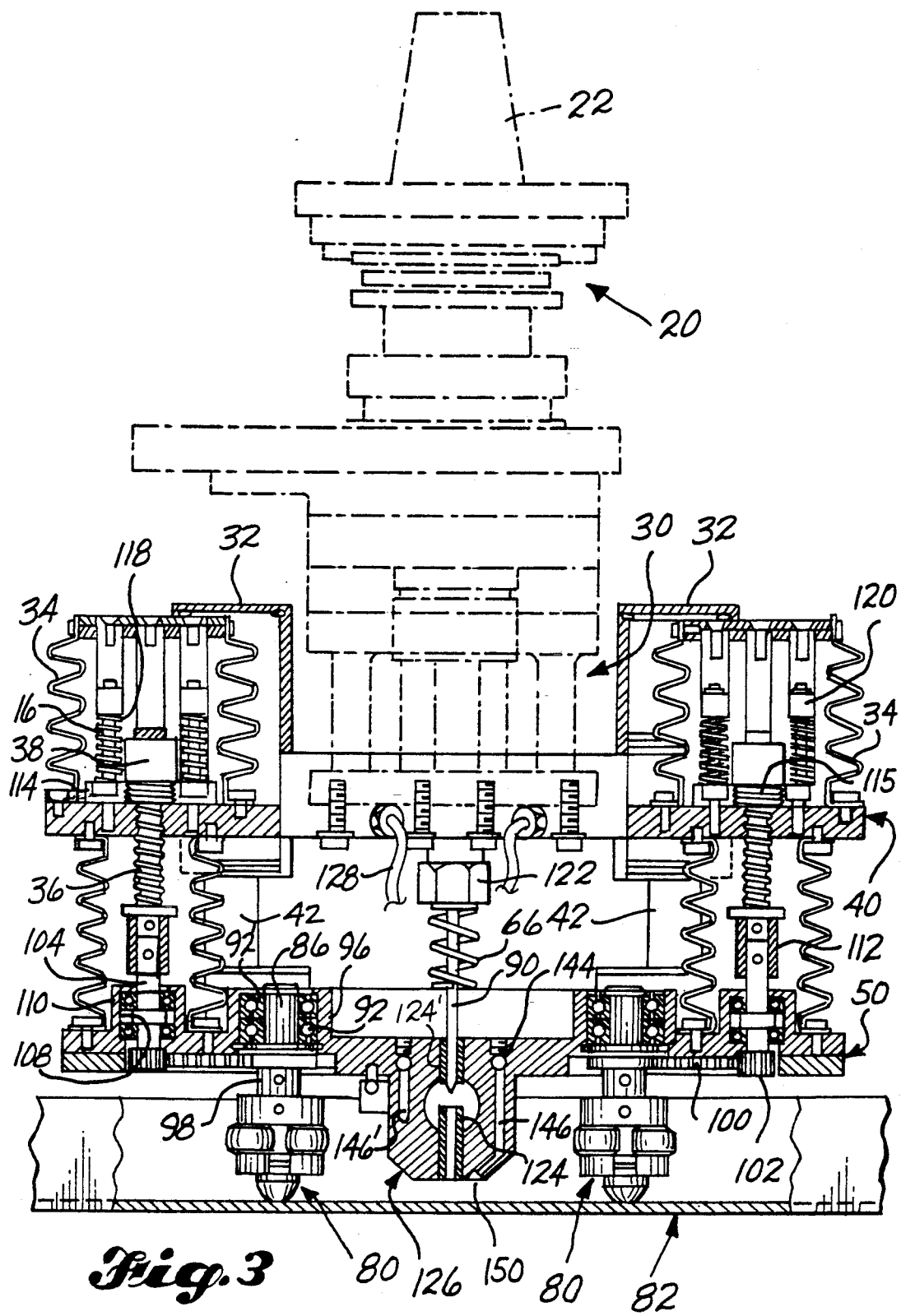
FIG. 3 is a sectional elevation of the end effector, shown in FIG. 2.

An adaptor plate 28 is screwed to the lower end of the speeder assembly 20 and has a pair of holes 29 which mate with outlet holes (not shown) for the cooling air in the bottom of the speeder assembly 20. The adaptor plate 28 facilitates the connection of a standoff tower 30 to the speeder assembly 20. As shown in FIGS. 2 and 3, the stand-off tower provides room for the pair of guide rod bearing columns 32 and a pair of elastomeric bellows enclosures 34 for enclosing the upper end of a pair of lead screws 36 and ballnuts 38 fastened to a top plate 40.

Figure 7:
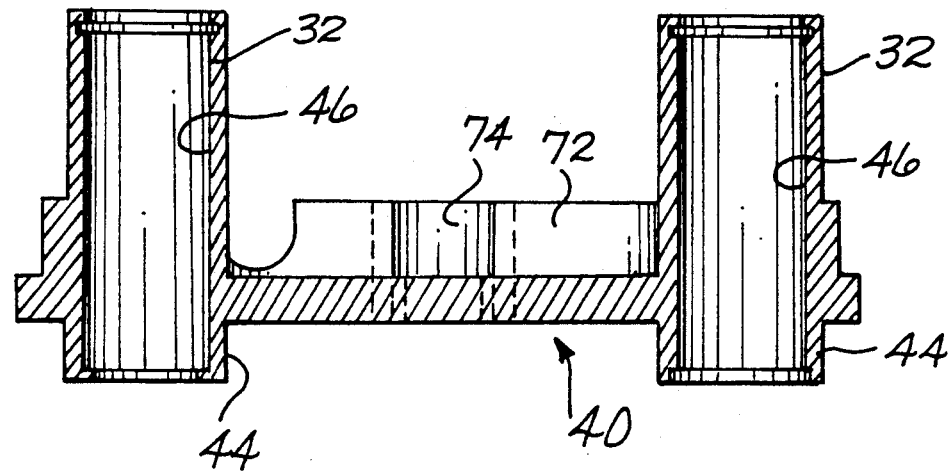
FIG. 7 is a sectional elevation along lines 7—7 in FIG. 6.
Figure 6:
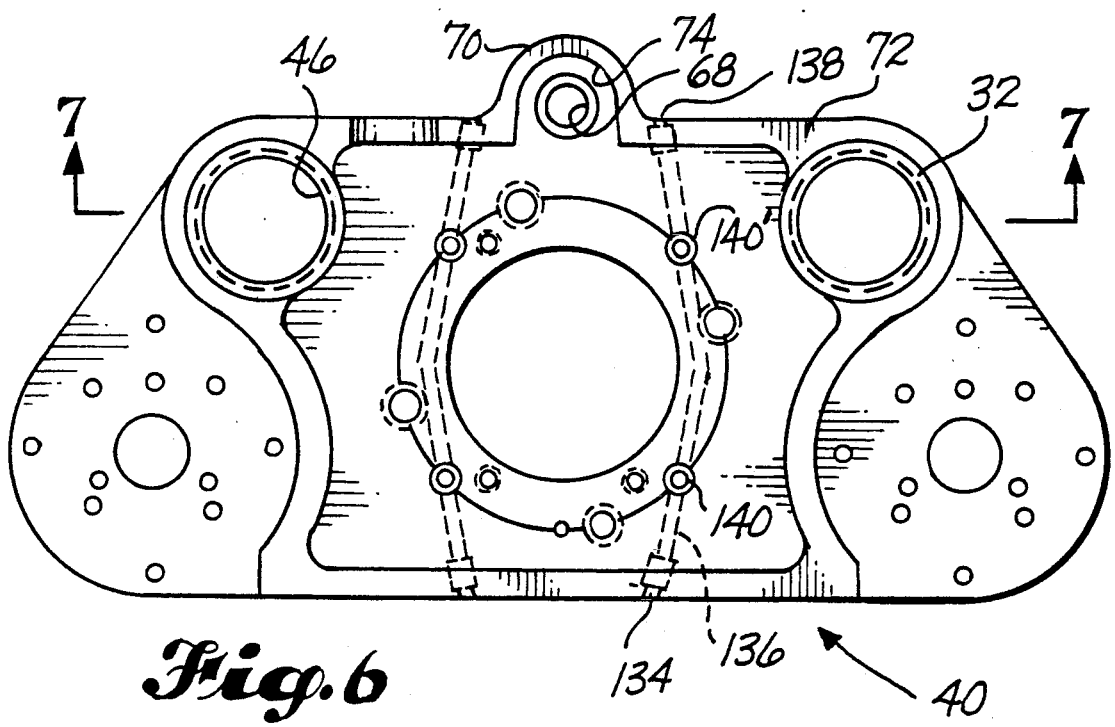
FIG. 6 is a plan view of the top plate of the end effector shown in FIGS. 1 and 2.

A pair of guide rods 42, shown in FIGS. 4 and 5, extends through a pair of bosses 44 projecting downwardly from the bottom of the top plate 40, vertically aligned under the guide rod bearing columns 32, as shown in FIGS. 6 and 7. The bosses and columns 32 enclose cylindrical chambers 46 which contain linear bearings 48 which guide the guide rods 42 for vertical movement of a base plate 50 vertically toward and away from the top plate 40.

Figure 9:
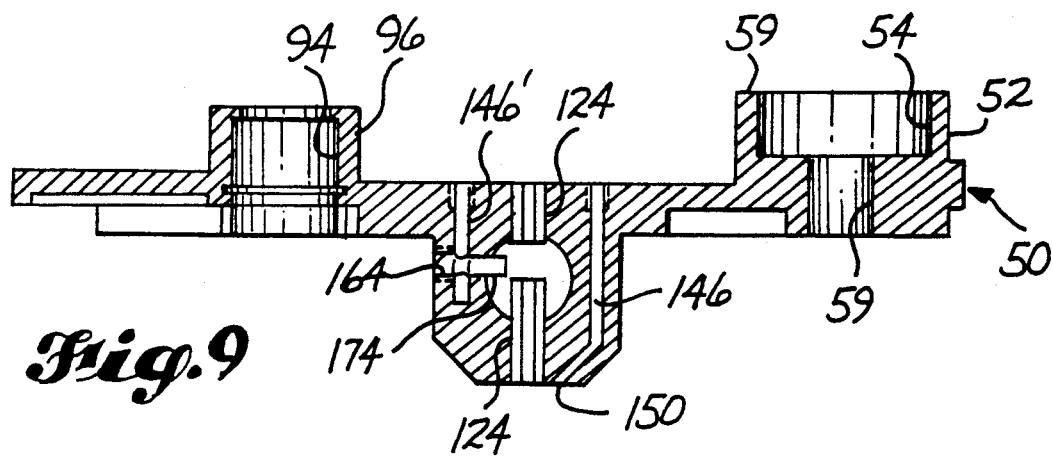
FIG. 9 is a sectional elevation along lines 9—9 in FIG. 8.
Figure 8:
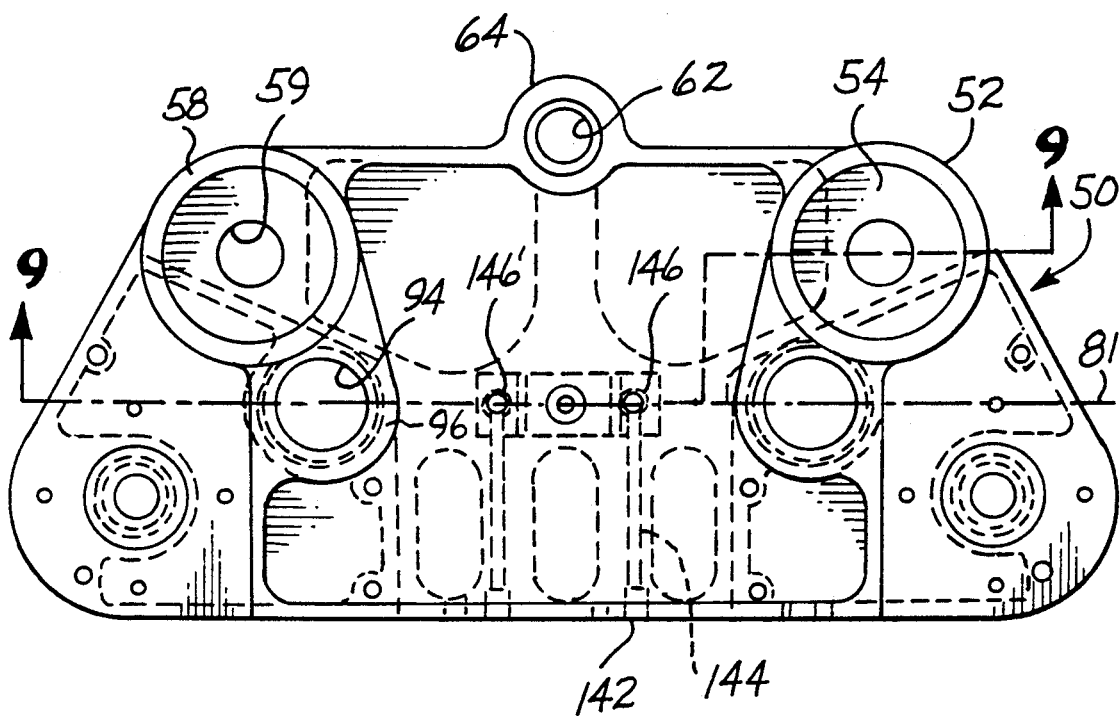
FIG. 8 is a plan view of the base plate of the end effector shown in FIGS. 1-5.

As shown in FIGS. 8 and 9, a pair of cylindrical bosses 52 project upward from the base plate 50 to surround a cylindrical well 54 which receives the cylindrical bosses 44 when the top plate 40 moves toward the base plate 40 during operation of the end effector. A urethane washer 56, shown in FIGS. 4 and 5, is bonded to the top surface 59 of the cylindrical bosses 52 to act as a bumper and a seal when the top plate 40 has moved fully downward into contact with the base plate 50. The meshing of the bosses 44 into the well 54 acts as a labrinth seal to prevent drill chips from being blown into the cylindrical well 54 or up into the bosses 44 and into the linear bearing 48 in the chamber 46. The guide rods 42 are pressed at their lower ends into bores 59 drilled in the base plate 50 and centered in the wells 54.

A spring guidepost 60, shown in FIGS. 4 and 5, is pressed into a stepped bore 62 drilled into a boss 64 formed on the back side of the base plate 50, as shown in FIG. 8. The spring post 60 provides a guide for a spring 66 compressed between the base plate 50 and the top plate 40, and an upward limit for separating movement of the top plate 40 and the base plate 50. The upper end of the spring post 60 projects through a hole 68 in a projection 70 on the back of the top plate 40, shown in FIG. 6. A stiffening flange 72 on the back of the top plate 40 follows the contour of the projection 70 to provide a well 74 which receives a collar 76 pressed and pinned on the end of the spring guidepost 60 on the projection thereof above the top plate 40, as shown in FIG. 5. The collar 76 engages the top surface of the top plate 40 within the well 74 to provide a limit on the upward movement of the top plate 40 away from the base plate 50. A hole 78 in the spring guidepost 60 receives a pin when it is desired to lock the top plate 40 in its closest position to the base plate 50 for service or adjustment of the end effector.

Figure 10:
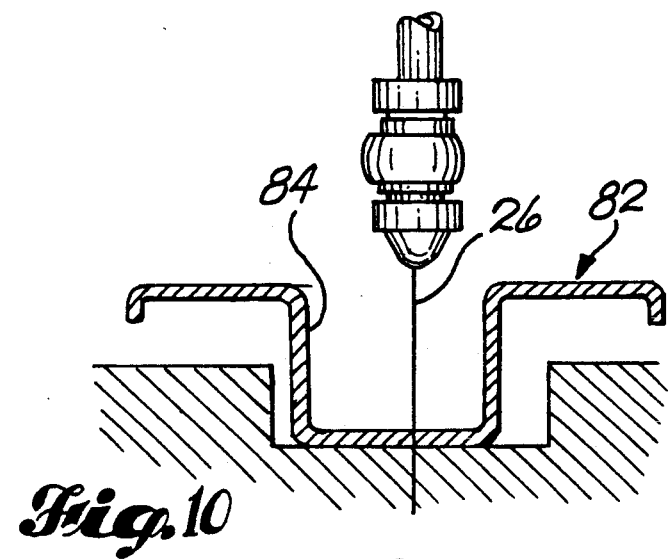
FIGS. 10-15 are schematic sketches of the cam roller assemblies operating to center a stringer under the centerline of the end effector shown in FIGS. 1-5.
Figure 11:
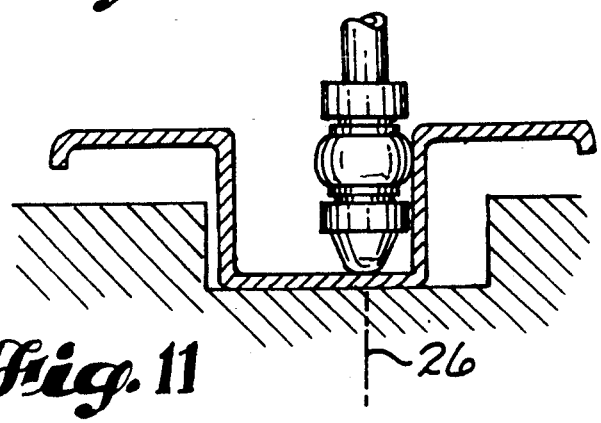
Figure 12:
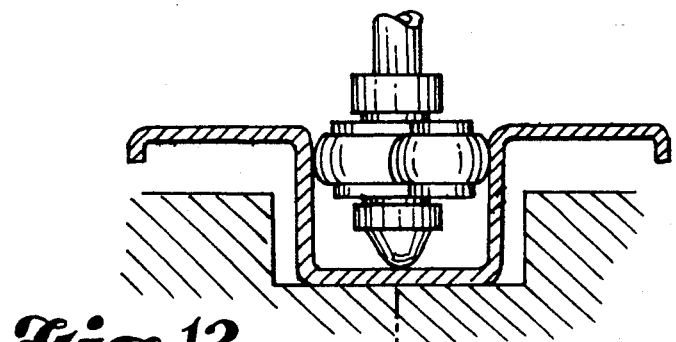
Figure 13:
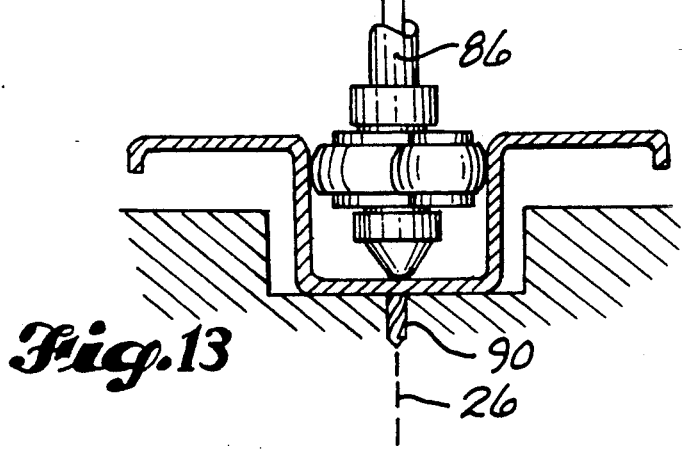
Figure 14:
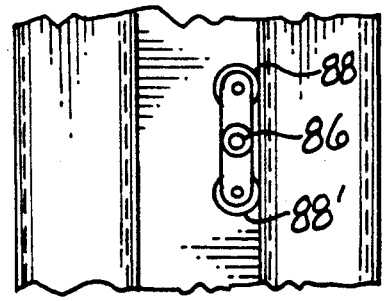
Figure 15:
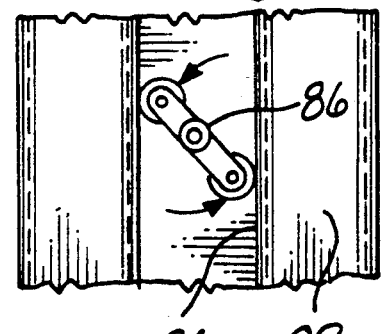

A pair of cam roller assemblies 80 projects downwardly from the base plate 50 equidistant from the centerline 26 of the end effector and aligned on a lateral axis 81 that intersects the centerline 26. The purpose of the cam rollers 80, as illustrated in FIGS. 10 through 15, is to center a channel-shaped workpiece, such as a stringer 82, on the centerline 26 of the end effector. The cam rollers 80 work by entering into the channel of the workpiece 82, which may be slightly misaligned with the centerline 26 as shown in FIGS. 10 and 11, and also in FIG. 14, and then rotating about the centerline of the cam roller shaft 86, which engages one of a pair of rollers 88 and 88' with the side of the channel 84 in the stringer 82. Rotation of the shaft 86 pushes the stringer to the right in FIG. 11 to the position shown in FIG. 12, at which point both rollers are engaged with the sides of the channel in the stringer 82 and the stringer is centered on the lateral axis 81 connecting the two cam roller shafts 84 of the two cam rollers 80, and a hole is drilled in the center of the channel of the stringer 82 by a drill 90 as illustrated in FIG. 13.

Figure 16:
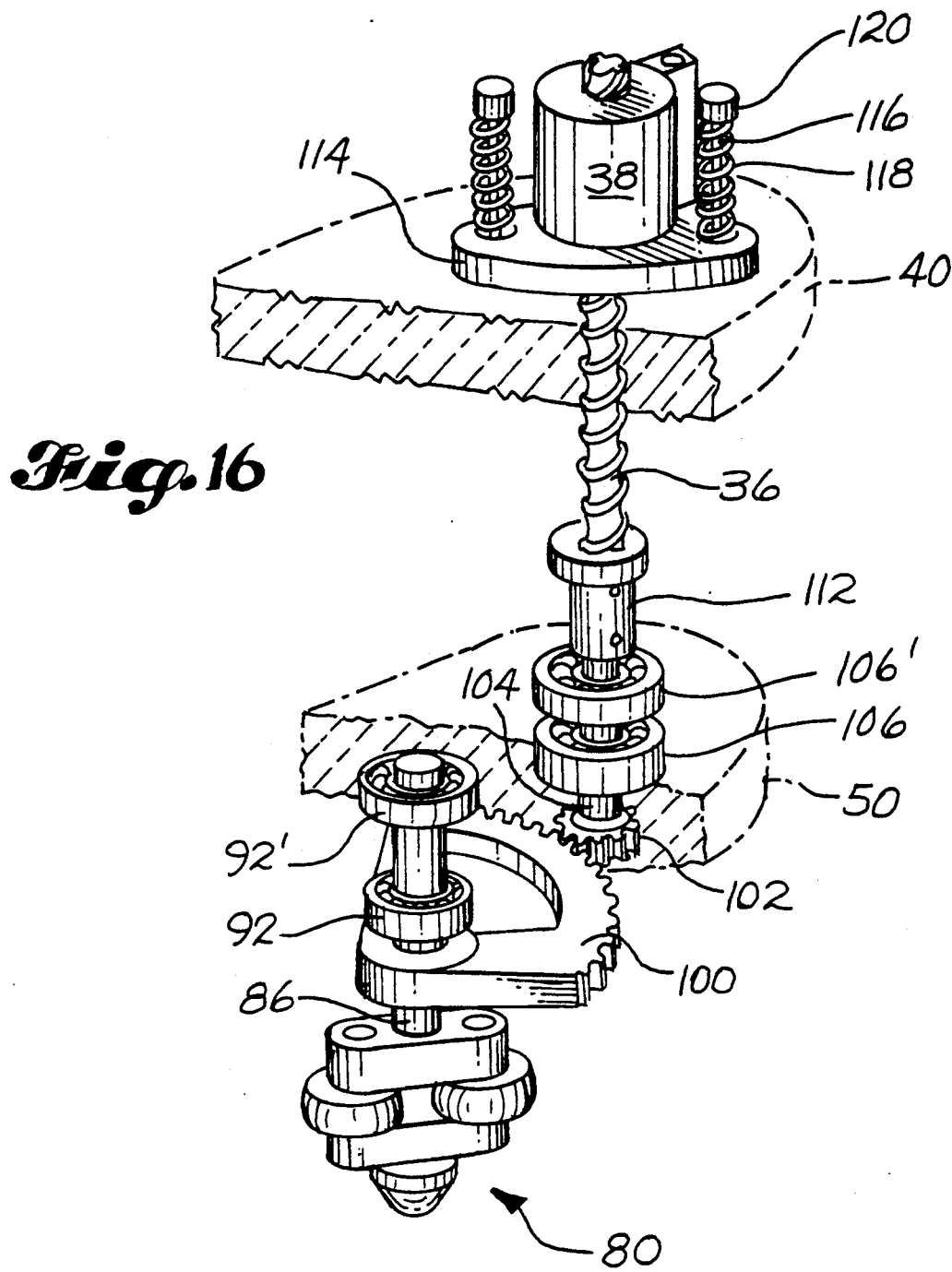
FIG. 16 is a schematic perspective of the roller cam assembly rotation system in the end effector shown in FIGS. 1-5.
Figure 17:
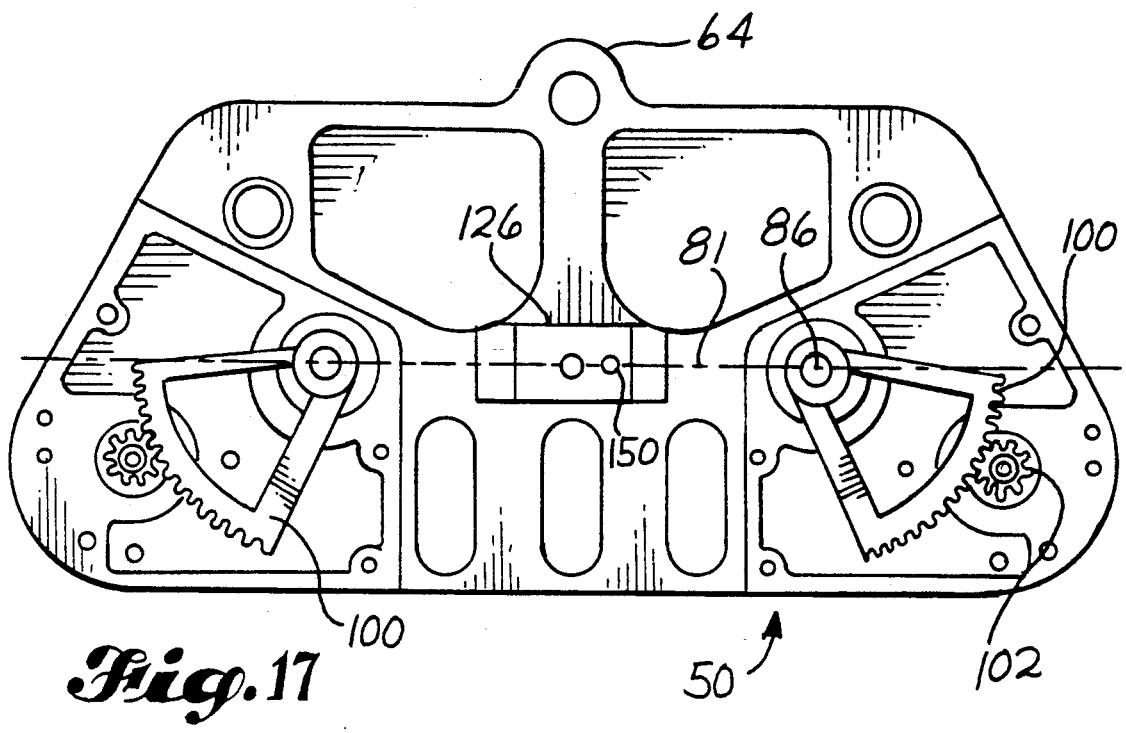
FIGS. 17 and 18 are bottom plan views of the base plate of the end effector shown in FIGS. 1-5.
Figure 18:
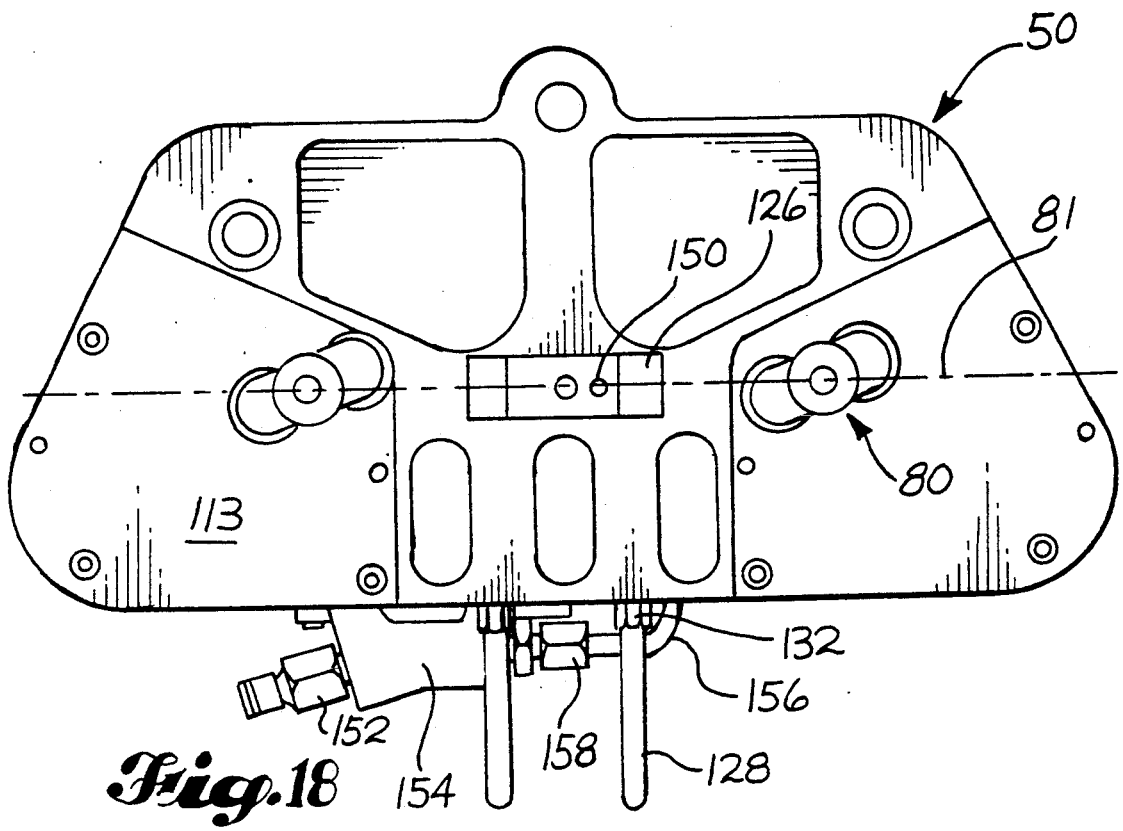

As shown in FIGS. 3 and 16, the shafts 86 of the cam rollers 80 are journaled in a pair of bearings 92 and 92', which are held in a cylindrical well 94 within an upstanding boss 96 on the top surface of the base plate 50. A collar 98, fastened to a gear sector 100, is pinned to the cam roller shaft 86 so that rotation of the gear sector 100 rotates the cam roller shaft 86 and the cam rollers 80. The gear sector 100 is engaged with a pinion gear 102, as shown in FIGS. 16 and 17, on the bottom of a pinion drive shaft 104. The pinion drive shaft 104 is journaled on the base plate 50 by a pair of bearings 106 and 106' mounted in a downwardly opening cylindrical recess 108 in a cylindrical boss 110 projecting upwardly from the top surface of the base plate 50. A pair of cover plates 113 are fastened to the underside of the base plate 50 to cover the sector gear 100 and the pinion 102 as shown in FIG. 18, and the lower end of the cam roller shaft 86 projects through a hole in each cover plate 113 for attachment of the cam rollers to the cam roller shafts 86.

A coupling 112, shown in FIGS. 3 and 16, attaches the upper end of the pinion drive shaft 104 to the lower end of the lead screw 36. In this way, rotation of the lead screw caused by vertical motion of the base plate 50 toward the top plate 40 drives the pinion shaft 104 and the pinion 102 to rotate the sector gear 100 and drive the cam rollers 80, as described previously.

The ballnuts 38, which are threadedly engaged with the lead screws 36, are each mounted on a ballnut mounting block 114. The ballnuts may be nylon "Supernuts" made by Ball Screw & Actuator Company in San Jose, Calif. They include a threaded portion 115 which is screwed into an internally threaded axial hole in the ballnut mounting block 114.

The mounting block 114 is held on the top surface of the top plate 40 by three spring studs 116, which are pressed into holes drilled in the base plate 40. A spring 118 is mounted on each of the spring studs 116 and is held in a compressed state by a spring cap 120 mounted on the top of each of the spring studs 116. The springs 116 hold the ballnut mounting block 114 down against the top surface of the top plate 40 while the base plate 50 is moving upward and pushing the lead screw 36 through the ballnuts 38, causing the lead screws 36 to rotate and rotate the paddles 80. When the paddles 80 have rotated as far as the channel 84 in the stringer 82 permit, and have centered the stringer 82 under the centerline of the drill 90, the paddles 80 can rotate no farther, and therefore the lead screw 36 stops rotating. However, the top plate 40 continues to descend toward the bottom plate 50 to advance the drill 90 into the bottom of the channel 84 in the stringer 82. To permit this motion, the ballnut 38 mounting on the ballnut mounting block 114 now rises against the spring force of the springs 118 on the spring studs 116.

When the hole has been drilled by the drill 90, the robot holding the conical shank 22 withdraws the end effector. The spring 66 on the spring guidepost 60 holds the base plate 50 down in the channel of stringer 82 while the top plate 40 retracts upward and retracts the drill 90 out of the hole it has just drilled in the bottom of the channel 84 in the stringer 82. As the top plate 40 retracts, the springs 118 push the ballnut and the mounting block 114 back down against the top surface of the top plate 40 without rotation of the lead screw 36, so the cam rollers 80 stay at their fully rotated position to hold the stringer in its centered position without putting any side loads on the drill 90 as it is retracted. Then, further retraction of the top plate 40 after the ballnut mounting block 114 is bottomed on the top surface of the top plate 40 causes the lead screws 36 to rotate in the opposite direction, while the spring 66 continues to hold the base plate 50 down in its lowermost position with the cam rollers 80 in the channel of the stringer 82. The rotation of the lead screws 36 rotates the cam roller assembly 80 to orient the long axis approximately with the length of the stringer 82 as shown in FIG. 18 and frees the cam rollers from the stringer 82. When the collar 76 on the spring guidepost 60 reaches the floor of the well 76, it exerts an upward force on the spring guidepost 60, which lifts the base plate 50 with the top plate 40 and removes the cam roller assembly 80 from the channel 84 of the stringer 82.

Figure 19:
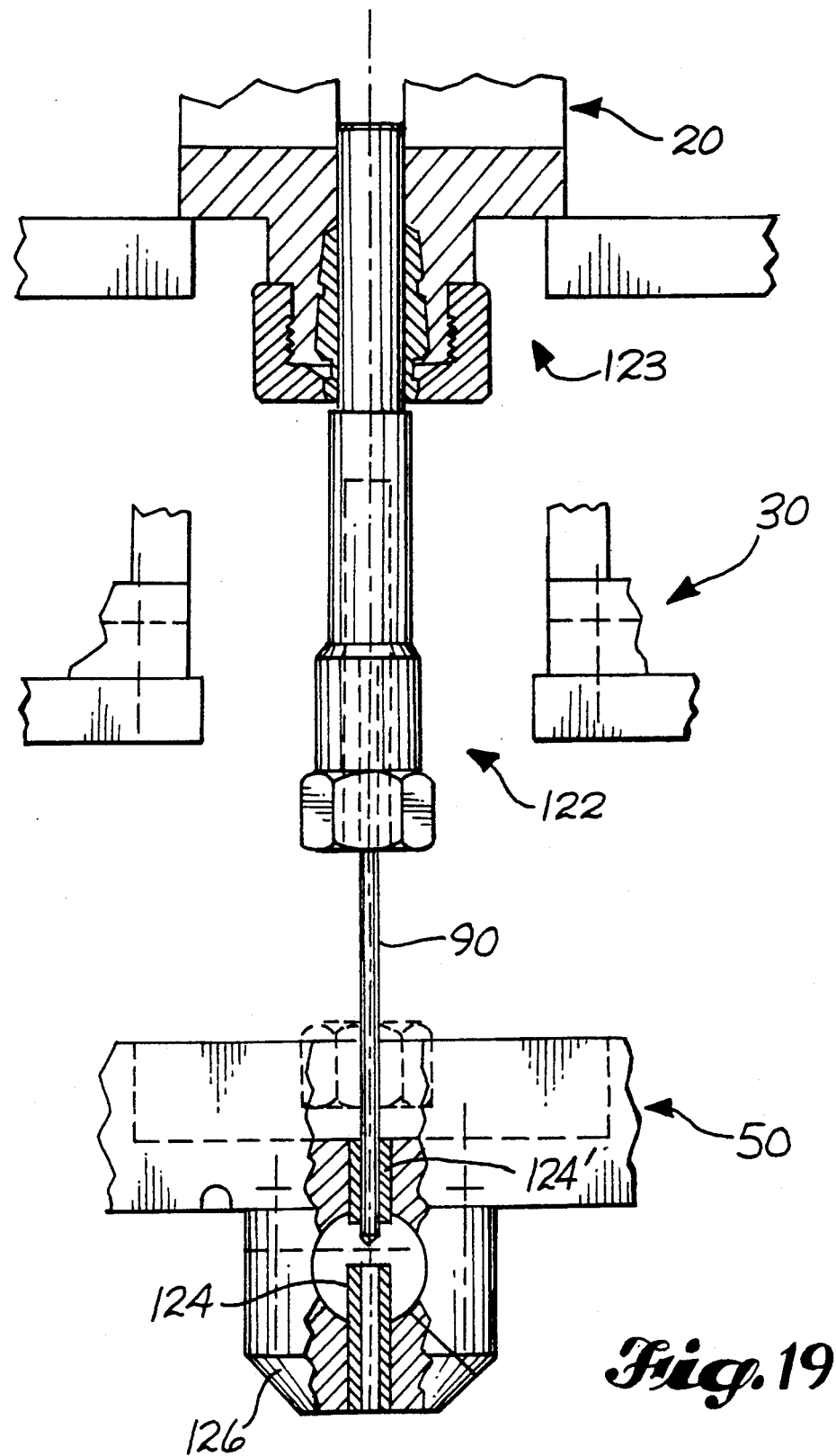
FIG. 19 is an elevation, partly in section, of a modified extension collet for use in the end effector shown in FIGS. 1-5.

A modified collet chuck 122 shown in FIG. 19 is chucked into the collet 123 of the speeder assembly 20 and projects down below the standoff tower 30 to receive the drill 90. The drill 90 is chucked into the modified collet chuck 122 by inserting a drill upward through a pair of bushings 124 and 124' mounted in an extension nose or tenon 126 projecting downward from the base plate 50. The end of the drill 90 is inserted into the modified collet chuck 122, which is tightened to hold the drill in a conventional manner. The use of the modified collet chuck 122 provides a rigid extension of the speeder chuck 123 and shortens the unsupported length of drill spanning the distance between the speeder and the drill support bushings 124 and 124' in the base plate. This allows a higher drill speed to be used than would be possible without the drill going into a resonance condition.

A pair of flexible air hoses 128 shown in FIGS. 5 and 18 extends between a pair of fittings 130 in the top plate 40, and a pair of fittings 132 in the base plate 50. The fitting 130 is mounted in a threaded receptacle 134 which communicates with a drilled hole 136, plugged at the back end 138 as shown in FIG. 6. The drilled hole 136 communicates with a pair of vertical holes 140 and 140' which are aligned with a pair of corresponding holes in the standoff tower 140, which in turn communicate with the holes 29 in the adaptor plate 28, to convey cooling air from the speeder assembly 20. The air hoses 128 carry the cooling air from the speeder assembly 20 through the hose 128 and the fitting 132, which is screwed into a threaded receptacle 142, which communicates with a hole 144 drilled into the base plate 50 as shown in FIG. 20. A pair of vertical holes 146 and 146' communicate with the holes 144 and 144' and convey the cooling air vertically into the nose 126. The hole 146 terminates in an air nozzle 150 directed at the point at which the drill 90 will enter the workpiece. The air blown through the air nozzle 150 blows the chips away from the drill and cools the drill. The hole 146' connects to a lubrication injector 160, as will be described below.

A quick disconnect fitting 152 shown in FIGS. 18 and 20 is screwed into a mounting block 154 fastened to the front of the base plate 50. The fitting 152 receives a flexible line for carrying a lubricant to the lubrication injector 160 where it is blown as a mist onto the drill 90 as it is about to descend into the workpiece. A tube 156 connects to the opposite side of the mounting block 154 by way of a fitting 158, and is connected at the other end of the tube 156 to the lubrication injector 160.

The lubrication injector 160, shown installed in the nose 126 in FIG. 21, and shown alone in FIG. 22, includes a threaded midsection 162 by which the injector can be threaded into a hole 164 drilled and tapped in the side of the extension nose 126. The outer end of the lubrication injector 160 is a hexagonal head 166 by which the lubrication injector 160 can be screwed into the tapped hole 164. A hole 168 is drilled into the side of the hexagonal head 166 and communicates with an axial hole 170 drilled through the body of the lubrication injector 160 and through a projecting nozzle 172. The projecting nozzle 172 extends into a tube 174 pressed into the inner end of the hole 164. The tube 174 projects into a lateral bore or lunette 176 drilled through the side of the extension nose 126. The tube is aligned with a gap between the drill bushings 124 and 124' through which lubrication can be injected onto the drill as it plunges toward the workpiece.

The vertical air hole 146' intersects the hole 164 between the inner section in which the tube 174 is pressed and the outer section which is threaded. This enables air under pressure entering the hole 146' to blow around the projecting nozzle 172 breaking up the lubrication injected through the lubrication tube 156 into a fine mist which is blown onto the drill 90 for lubrication.

The cam roller assemblies 80 shown in FIGS. 1, 3, 4, etc. are assembled from the parts shown in the exploded view of FIG. 23. The cam roller assembly includes a cam roller body 180 having a central vertical axial hole 182 by which the body 180 is mounted on the cam roller shaft 86. A lateral hole is drilled through the body 180 intersecting the hole 182 for receiving a roll pin by which the cam roller assembly is attached to the shaft 86. A pair of side holes 186 and 186' drilled in the body 180 parallel to and equidistant from the hole 182 receive a reduced diameter upper end 188 of a pair of roller pins 190 with an interference fit. A pair of rollers 192 and 192' are slid onto the large diameter central portion 194 of the roller pins 190 where they rotate freely. A cap 196 is pressed onto the lower ends 198 of the roller pins 190 and a thrust pin 200 is inserted into a central hole 202 in the cap 196 and is held in the hole 202 by an "O" ring in a groove 204 in an upstanding shank 206 of the thrust pin 200. The thrust pin has a conical body 208 that projects downward from the cap 186 to bear the thrust loads exerted on the cam roller assembly while allowing it to rotate about it vertical axis.

Obviously, numerous modifications and variations of the preferred embodiment described herein will occur to those skilled in the art in view of this disclosure. Accordingly, these modifications and variations, and the equivilents thereof may be practiced while remaining within the spirit and scope of the invention as defined in the following claims.

I claim:

1. An end effector for positioning a channel-shaped workpiece and drilling a hole at a predetermined position in the workpiece, comprising:
   a top plate having structure for connecting a drill driver to said top plate, and an opening through which a drill mounted in said drill driver can extend along a drill axis to drill a hole in said workpiece;
   a base plate mounted beneath said top plate on guides for self-parallel movement toward and away from said top plate;
   a lead screw having one end rotatably mounted in an axially fixed position relative to said base plate, and threadedly engaged with a nut mounted on said top plate such that said lead screw rotates when said base plate moves toward and away from said top plate;
   a cam roller assembly rotatably mounted on said base plate and projecting from the bottom surface thereof in a position to enter said channel in said workpiece when said end effector is located over said workpiece;
   a gear reduction drive train connected between said lead screw and said cam roller assembly whereby said lead screw drives said cam roller assembly to rotate in said workpiece channel and move said workpiece to the desired position under said drill when said base plate approaches said top plate under influence of a robot pressing said end effector against said workpiece.

2. An end effector as defined in claim 1, wherein:
   said gear reduction drive train includes a pinnion gear mounted rotatably in said base plate and coupled to said lead screw, and a sector gear fixed to said cam roller assembly and having gear teeth engaged with said pinnion gear, whereby rotation of said pinnion gear driven by said lead screw drives said sector gear and rotates said cam roller assembly.

3. An end effector as defined in claim 2, further comprising:
   a stub shaft rotatably mounted in said base plate, said stub shaft having an upper end protruding above said base plate and a lower end to which said pinnion gear is attached; and
   a coupling torsionally and axially connecting said one end of said stub shaft to said one end of said lead screw.

4. An end effector as defined in claim 1, further comprising:
   a tenon projecting downward from an underside of said base plate and having a lunette opening therethrough on a lateral axis; and
   a pair of hardened drill guide bushings mounted in said tenon coaxially with said drill axis for receiving and guiding said drill.

5. An end effector as defined in claim 4, further comprising:
   a nozzle mounted in said tenon and opening into said lunette along a line normal to both said drill axis and said lunette axis;
   a source of lubricant connected to said nozzle and a pump for injecting a metered amount of said lubricant through said nozzle to lubricate said drill.

6. An end effector as defined in claim 5, further comprising:
   a duct in said tenon communicating with a source of air pressure;
   a manifold in said tenon defined by an inside wall communicating with said duct and said lunette, and receiving said nozzle in concentric spaced relation to said inside wall, said nozzle and said inside wall defining between them an annular passage for flow of air from said duct around said nozzle to blow air onto said drill and to atomize said lubricant from said nozzle into an aerosol and blow said lubricant onto said drill.

7. An end effector as defined in claim 4, further comprising:
   a second lead screw and cam roller assembly mounted on said base plate symmetrically with respect to said drill axis on the side of said tenon opposite to the side on which said first-mentioned lead screw and cam roller assembly are mounted.

8. An end effector as defined in claim 1, wherein:

said nut is torsionally fixed on said top plate and axially biased against said top plate by springs which permit said nut to rise off said top plate when said lead screw has reached the desired torque by virtue of the movement of said base plate and said top plate toward each other;

whereby said lead screw will rotate as said top plate and said base plate move toward each other to drive said cam roller assembly until said cam roller assembly has engaged the sides of said workpiece channel and moved said workpiece to the desired position under said drill, whereupon said cam roller assembly will rotate no further and will exert a reaction torque back through said lead screw to halt rotation of said lead screw in said nut and instead lift said nut off said top plate against the force of said biasing springs.

9. An end effector as defined in claim 1, further comprising:

a resilient device for urging said top plate away from said base plate to rotate said cam roller assemblies away from said workpiece channel sides before said base plate moves away from said workpiece.

10. An end effector as defined in claim 9, wherein:

said resilient device includes a post mounted on said base plate and slidably received in a bushing in said top plate; and a compression spring mounted between said top plate and said base plate on said post and disposed to exert a separating force between said top and base plates.

11. An end effector as defined in claim 10, further comprising:

a spring well in said base plate surrounding said post to receive said spring and provide a space to accomodate the solid length of said spring at maximum compression thereof while permitting said base plate and said top plate to come into close proximity without interference by said fully compressed spring.

12. An end effector as defined in claim 1, wherein said cam roller assembly includes:

a paddle shaft having an upper end mounted in bearings in said base plate for rotation about a vertical axis;

an elongated paddle body having two ends and a center position connected to a lower end of said paddle shaft, said body extending outward in opposite directions from said paddle shaft axis;

a pair of roller pins, each of said pins having an upper end connected to a respective one of said paddle body ends, respectively, and each pin projecting vertically downward therefrom to terminate in a lower end;

an elongated paddle cap having two ends, one each of said paddle cap ends connected to a respective one of said lower ends of said pins;

a roller rotatably mounted on each of said paddle pins and projecting radially beyond said ends of said paddle cap and said paddle body.

13. An end effector as defined in claim 12, wherein said cam roller assembly further includes:

a thrust pin mounted on an underside of said paddle cap coaxially to said paddle shaft and terminating in a downwardly facing rounded point that engages said workpiece to locate the downward extremity of the movement of said cam roller assembly into said workpiece channel and to serve as a fulcrum about which said cam roller assembly can pivot when it turns to engage said workpiece channel sides.

14. An end effector as defined in claim 1, further comprising:

an air passage in said top plate communication with a source of air pressure an air passage in said base plate having one end terminating in an orifice aimed at a point on said drill axis at which said drill enters the workpiece when drilling said hole therein;

an air hose connected at one end to said top plate in communication with said top plate air passage, and connected at the other end to said base plate in communication with said base plate air passage;

whereby chips cut by said drill when drilling into said workpiece can be blown away by air flowing under pressure from said source of air pressure through said air passages and said air hose while allowing said base plate to move axially relative to said top plate.

15. An end effector as defined in claim 14, further comprising:

a tenon projecting downward from an underside of said base plate and having a drill guide bushing mounted therein coaxially aligned with said drill axis; and said base plate air passage includes a portion drilled in said tenon and having a portion angled inwardly toward said drill axis to cool said drill and blow chips away as they are being cut.

16. An end effector as defined in claim 1, wherein:

said guides include at least one guide shaft mounted on said base plate and received in a linear bearing on said top plate for guiding said self-parallel movement of said base plate toward and away from said top plate.

17. An end effector as defined in claim 1, wherein:

said guides include two guide rods pressed into vertical bores in said base plate, one on each lateral side of said base plate;

two bosses on said top plate axially aligned with said guide rods, said bosses projecting below the bottom surface of said top plate;

a vertical bore drilled through each of said bosses, each bore containing a linear bearing for guiding vertical movement of said guide rods when said base plate moves vertically with respect to said top plate;

a well opening in the top surface of said base plate surrounding each of said guide rods, said wells each having an inside diameter sized to receive said bosses whereby said base plate can lie closely adjacent to said top plate at the maximum extension of said guide rods up into said linear bearings.

18. An end effector as defined in claim 17, further comprising:

an annular seal mounted on said base plate around each of said wells and sized to contact said bosses when said bosses enter said wells to seal said well against entrance of drill chips when said drill is drilling holes in said workpiece.

19. A method of positioning a channel-shaped workpiece and drilling a hole in said workpiece at a predetermined location therein, comprising:

inserting a cam roller assembly mounted on a lower end of an end effector into said channel;

exerting an axial force on said cam roller assembly with said end effector by pressing said cam roller assembly in an axial direction against said workpiece; and converting said axial force to a torque on said cam roller assembly and thereby rotating said cam roller assembly to engage opposite sides of said channel with rollers on said cam roller assembly to move said workpiece to a desired position.

20. A method as defined in claim 19, wherein:

said converting step includes moving a lead screw axially in a nut located on said end effector to rotate said lead screw; and coupling said rotation of said lead screw through a gear reduction drive train to said cam roller assembly to rotate said cam roller assembly.

* * * * *